(12) United States Patent
Wettlaufer et al.

(10) Patent No.: US 9,763,471 B2
(45) Date of Patent: Sep. 19, 2017

(54) METHOD FOR MULTI-STAGE CUTTING AND JUICE PRESSING

(71) Applicants: Dale Wettlaufer, Sarasota, FL (US); Eric Wettlaufer, West Falls, NY (US)

(72) Inventors: Dale Wettlaufer, Sarasota, FL (US); Eric Wettlaufer, West Falls, NY (US)

(73) Assignee: Goodnature Products, Inc., Buffalo, NY (US)

( * ) Notice: Subject to any disclaimer, the term of this patent is extended or adjusted under 35 U.S.C. 154(b) by 0 days.

(21) Appl. No.: 15/068,283

(22) Filed: Mar. 11, 2016

(65) Prior Publication Data
US 2016/0262440 A1   Sep. 15, 2016

Related U.S. Application Data

(60) Provisional application No. 62/131,632, filed on Mar. 11, 2015.

(51) Int. Cl.
*A23N 1/02* (2006.01)
*A23L 2/04* (2006.01)
*B30B 9/02* (2006.01)

(52) U.S. Cl.
CPC ............. *A23N 1/02* (2013.01); *A23L 2/04* (2013.01); *B30B 9/02* (2013.01)

(58) Field of Classification Search
CPC ......... A23N 1/02; A23L 2/04; A23V 2002/00; B30B 9/02
See application file for complete search history.

(56) References Cited

U.S. PATENT DOCUMENTS

| 18,895 A | 12/1857 | Eiberweiser |
| 194,457 A | 8/1877 | Newsam |

(Continued)

FOREIGN PATENT DOCUMENTS

| CN | 201115592 | 9/2008 |
| CN | 201604303 | 10/2010 |

(Continued)

OTHER PUBLICATIONS

English Translation for RU 2120962 published Oct. 1998.*

(Continued)

*Primary Examiner* — Anthony Weier
(74) *Attorney, Agent, or Firm* — Woods Oviatt Gilman LLP; Katherine H. McGuire, Esq.

(57) ABSTRACT

Juice extraction using multiple pairs of juice extractors and comminutors which reduce the food pieces into successively smaller pieces with juice extraction occurring after each comminuting step. Coarse food pieces are pressed with extracted juice directed to a juice holding tank. The pressed coarse chop food pieces fall into the hopper of a second comminutor which performs a medium chop on the now pressed but still coarse chopped food pieces. The medium chopped food pieces are then fed from the second comminutor into the juice extraction chamber of a second juice extractor whereupon the medium chopped food pieces are pressed with extracted juice directed to a juice holding tank. Any number of comminutor and juice extraction pairs may be used in serial fashion to optimize the percentage of juice extracted in a minimum amount of time.

8 Claims, 8 Drawing Sheets

(56) References Cited

U.S. PATENT DOCUMENTS

| | | | |
|---|---|---|---|
| 218,879 A | 8/1879 | Hartshorn | |
| 241,348 A | 5/1881 | Gilbert | |
| 250,979 A | 12/1881 | Russell | |
| 531,388 A | 12/1894 | Root et al. | |
| 630,669 A | 8/1899 | Dale et al. | |
| 929,717 A | 8/1909 | Self | |
| 1,131,032 A | 3/1915 | Berrigan | |
| 1,456,257 A | 5/1923 | Stevenson | |
| 1,500,964 A | 7/1924 | Starks | |
| 1,775,830 A | 9/1930 | Reynolds | |
| 2,022,679 A | 5/1933 | Leo | |
| 2,068,013 A | 1/1937 | Fridlender et al. | |
| 2,087,435 A | 7/1937 | Hubbert | |
| 2,689,857 A * | 9/1954 | MacIlwaine | C11B 1/10 554/10 |
| 3,154,122 A | 10/1964 | Batchelor et al. | |
| 3,207,064 A | 9/1965 | Hauser-Bucher | |
| 3,230,054 A * | 1/1966 | Ling | C11B 1/00 422/308 |
| 3,425,869 A * | 2/1969 | Farmer | C13B 10/04 100/147 |
| 3,478,796 A * | 11/1969 | Rafanelli | A23N 15/025 99/495 |
| 3,552,304 A | 1/1971 | French et al. | |
| 4,214,519 A | 7/1980 | Stollenwerk et al. | |
| 4,225,625 A * | 9/1980 | Gerow | A23L 19/07 426/481 |
| 4,442,767 A | 4/1984 | Johnson | |
| 4,586,430 A | 5/1986 | Tichy et al. | |
| 4,643,088 A | 2/1987 | Kollmar | |
| 4,680,808 A | 7/1987 | Paleschuck | |
| 4,707,370 A * | 11/1987 | Kakis | A23B 7/02 34/398 |
| 4,892,665 A | 1/1990 | Wettlaufer | |
| 5,031,524 A | 7/1991 | Wettlaufer | |
| 5,146,848 A | 9/1992 | Dufour | |
| 5,207,152 A | 5/1993 | Wettlaufer | |
| 5,267,509 A | 12/1993 | Wettlaufer | |
| 5,275,097 A | 1/1994 | Wettlaufer | |
| 5,356,083 A | 10/1994 | Wettlaufer | |
| 6,105,640 A | 8/2000 | Holand et al. | |
| 6,123,018 A | 9/2000 | Wettlaufer et al. | |
| 6,159,527 A | 12/2000 | Wettlaufer | |
| 6,422,138 B1 | 7/2002 | Ballard | |
| 6,457,403 B1 | 10/2002 | Wettlaufer et al. | |
| 6,644,366 B2 | 11/2003 | Johnson | |
| 6,723,355 B2 * | 4/2004 | Gunnewig | A23L 2/04 426/489 |
| 7,448,317 B2 | 11/2008 | Pinnow | |
| 7,469,632 B1 | 12/2008 | McClune | |
| 8,535,744 B1 | 9/2013 | Taghaddos | |
| 8,578,846 B2 | 11/2013 | Sherwood et al. | |
| 2003/0021867 A1 * | 1/2003 | Gunnewig | A23L 2/04 426/51 |
| 2008/0098908 A1 | 5/2008 | Song et al. | |
| 2009/0301318 A1 | 12/2009 | Torrisi et al. | |
| 2010/0326293 A1 | 12/2010 | Derubeis | |
| 2014/0224137 A1 | 8/2014 | Wettlaufer et al. | |
| 2014/0314918 A1 | 10/2014 | Wettlaufer et al. | |

FOREIGN PATENT DOCUMENTS

| | | |
|---|---|---|
| CN | 202515365 | 11/2012 |
| EP | 1364558 | 3/2005 |
| EP | 1017561 | 6/2005 |
| FR | 2806880 | 10/2001 |
| JP | 2006-094902 | 4/2006 |
| RU | 2120962 | * 10/1998 |
| WO | 2007/068378 | 6/2007 |
| WO | 2014-182423 | 11/2014 |

OTHER PUBLICATIONS

Norwalk. 2014. Model 280 Features. Retrieved on Oct. 9, 2015 from http://www.norwalkjuicers.com/features/.

Norwalk. 2014. Model 280 Technical Specifications. Retrieved on Oct. 9, 2015 from http://www.norwalkjuicers.com/technical-specs/.

* cited by examiner

METHOD FOR MULTI-STAGE CUTTING AND JUICE PRESSING

BACKGROUND OF THE INVENTION

This invention relates to apparatus and methods for extracting juice from a food mass such as fruits and vegetables, and more particularly relates to improved industrial apparatus and methods therefor.

Various apparatus and methods for extracting juice from fruits and vegetables have been known for a very long time with most all comprising three basic steps: forming the food mass into small pieces (e.g., by cutting, grinding or crushing), extracting the juice from the small pieces (e.g., by pressing), and separating the extracted juice from the food mass solids (e.g., by allowing the juice to fall from the food mass solids by gravity).

The two primary parameters for juice pressing are percent of juice extracted from a given food mass and extraction time. In order to maximize the efficiency of the juice extraction process, apparatus and methods are designed in an attempt to maximize the percentage of juice extracted from a food mass while minimizing the time to do so. The problem is that these two parameters of percent juice extracted versus time tend to work against each other in that the more the food mass is macerated into smaller pieces prior to juice pressing, the higher the chance the machine will become clogged resulting in machine downtime which thereby increases the time between successive pressings. Another potential problem is that should the food solids be made too small, it is more difficult to keep them separated from the juice being extracted therefrom. Conversely, the less the food is macerated (to decrease the chance of clogging the machine and to easily separate the juice from the solids) the less percentage of juice is extracted due to the failure of breaking open a majority of the individual plant cells in the food piece which contains the juice. Many prior art apparatus and methods have attempted to balance these two parameters but with varying success. There thus still remains a need for improved apparatus and methods which will further maximize percent of juice extracted while minimizing the time to do so.

SUMMARY OF THE INVENTION

The present invention addresses the above needs by providing apparatus and methods for extracting juice from a food mass which involves successively reducing the individual pieces of the food mass into smaller pieces while extracting juice after each food piece size reduction step. As used herein, words such as "reduce", "macerate" and "comminute" (in any form) are meant to include any and all means by which a single food piece may be formed into multiple smaller pieces. A non-exhaustive list of such means includes cutting, chopping, grinding and crushing, for example.

A juice extraction cycle using multiple juice extractors and comminutors in accordance with the invention begins with delivering whole food pieces to be juiced to a first comminutor which performs a coarse chop. For example, in the case of apples or similar fruit, the "coarse" initial chop would preferably be into "cubes" ¼" per side, and then the final comminuting step would have pieces resembling cubes with ¹⁄₆₄" per side, or smaller. In the case of carrots which are firmer than apples, and more fibrous, the initial coarse chop might be into cubes, ¹⁄₁₆" per side, and the final comminuting step would provide a food mass resembling the consistency of peanut butter.

The coarsely chopped food pieces are fed into the pressing chamber of a first juice extractor. The coarse food pieces are pressed with extracted juice falling into the collection tray and then directed to a juice holding tank. The tray of first juice extractor is retracted allowing the pressed coarse chop food pieces to fall into the hopper of a second comminutor which performs a medium chop on the now pressed but still coarse chopped food pieces. The medium chopped food pieces are then fed from the second comminutor into the juice extraction chamber of a second juice extractor whereupon the medium chopped food pieces are pressed with extracted juice falling into the juice collection tray of the second juice extractor and then directed to a juice holding tank.

This process may be repeated with any desired number of successive pairs of comminutors and juice extractors with the food pieces being chopped into successively finer and finer pieces as they pass from one comminutor and juice extractor to the next comminutor and juice extractor. Each time the food pieces are further chopped new surface areas of the food piece and thus more juice containing cells are revealed which may then be ruptured at the next pressing station allowing more juice to be extracted in a relatively short pressing time. The present invention thus provides apparatus and methods by which a maximum quantity of juice can be extracted while minimizing the time to do so.

BRIEF DESCRIPTION OF THE DRAWINGS

The invention will further be described, by way of example, with reference to the accompanying drawings.

Similar reference characters may refer to similar parts throughout the several views of the drawings.

DETAILED DESCRIPTION

Figure 1A:
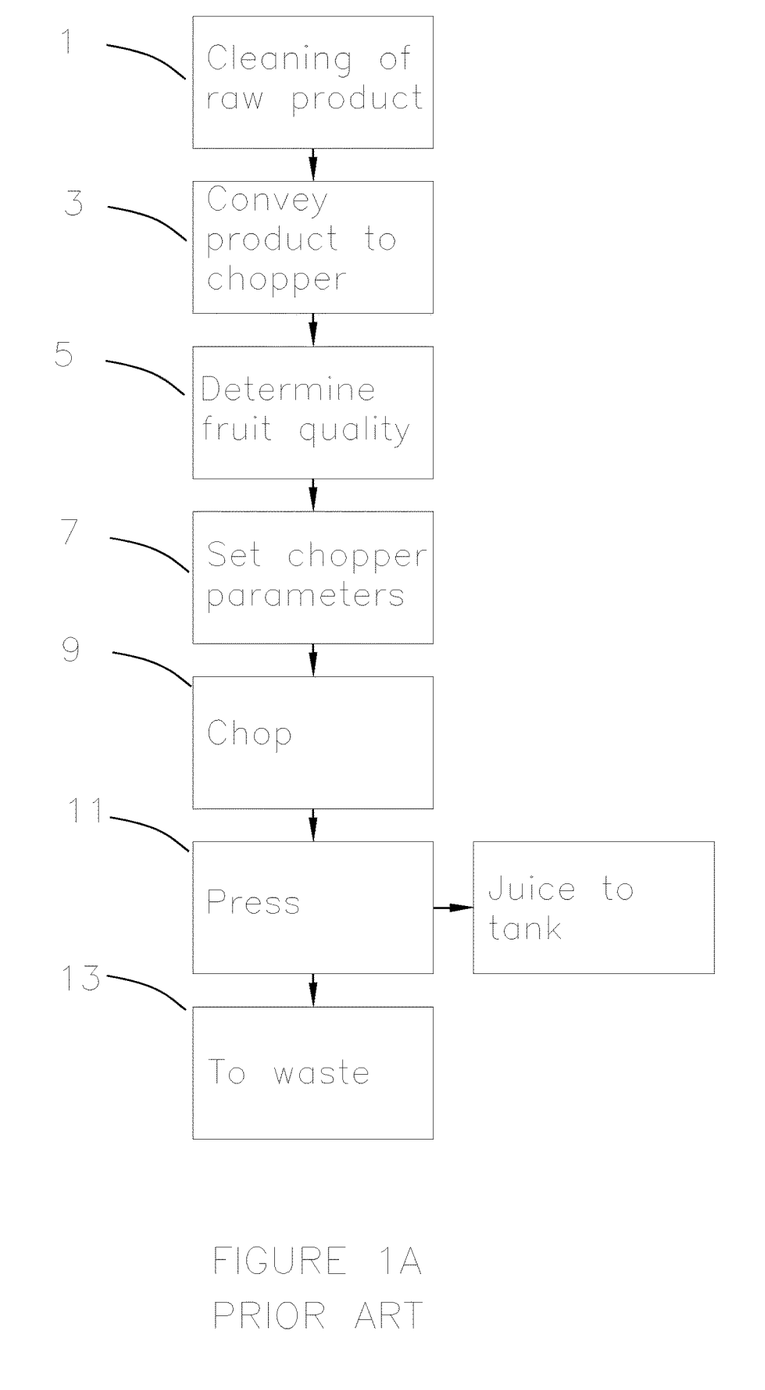
FIGS. 1a and 1b are flow charts of prior art methods of juice extraction.

Referring to FIG. 1A, a simple flowchart describes a typical prior art method of processing a food mass such as fruit into juice. In step 1 the incoming food pieces are soaked and washed according to established standards. At step 3 the washed food pieces are passed to a station where a worker evaluates the condition of the food pieces as seen at step 5. Based upon certain known criteria such as degree of ripeness and firmness of the food pieces, the skilled operator will estimate how fine to chop the food pieces and will set the macerator (e.g., chopper) to the desired setting seen at step 7. As discussed above, the finer the chop the greater the juice yield but the higher the chance the machine will become clogged. The operator must therefore be skilled and experienced so as to determine the most effective setting for the macerator based on the condition of the food pieces. Should the food pieces be cut too coarse, the juice yield will be low; should the food pieces be cut too fine, the machine may become clogged and/or the processing time of the resultant slurry is exponentially increased in order to filter the juice from the very fine solids.

Once the operator has selected the desired maceration parameters, the food pieces are macerated (e.g., chopped) as seen at step 9. The macerated food pieces are then pressed as seen at step 11 where the juice is forced out of the food solids (called "pomace" or "cake"). The juice is directed to a holding tank while the cake is discarded as seen at step 13.

The steps illustrated in FIG. 1A illustrate the procedure for making juice the way it is practiced currently during the making of fresh juice which is ready for consumption (i.e., juice that is minimally processed as illustrated in FIG. 1A and does not include further processing steps such as the application of heat, for example).

Figure 1B:
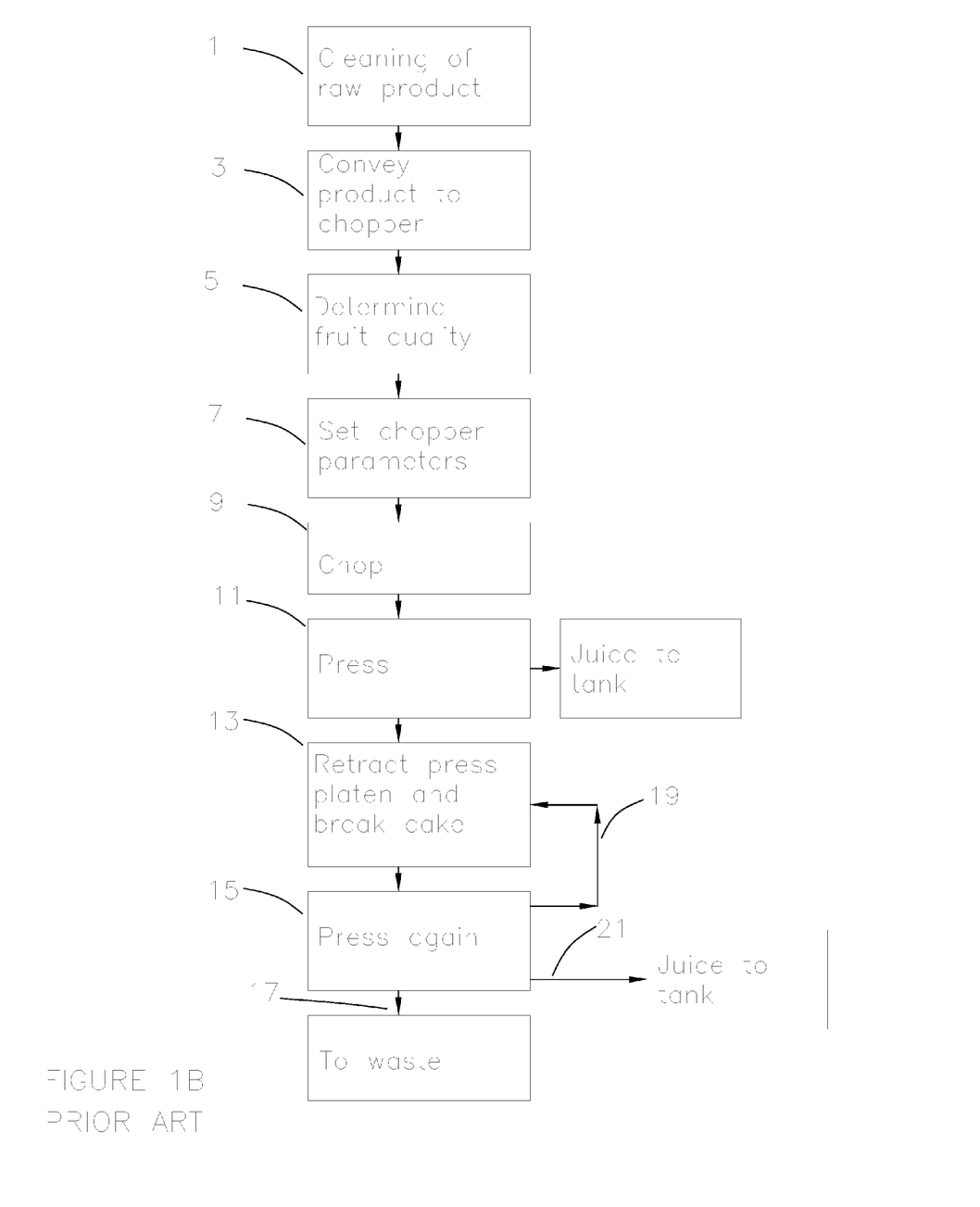

While FIG. 1A shows a prior art method for making fresh juice, FIG. 1B is a flow chart showing a prior art method for making juice which is not suitable for fresh consumption (e.g., making juice concentrate) where flavor and taste are secondary in importance to juice yield which is of primary importance.

Referring to FIG. 1B, all steps therein are substantially identical to the steps in FIG. 1a except boxes 13, 15 and 19 show a process often practiced where the cake is broken up inside the machine and then pressed again to extract any juice remaining inside the cake. This breaking and re-pressing of the cake may be done several times over until substantially all the available juice is extracted from the cake which is then discarded to waste at step 17. This entire process can take place typically over one to two hours.

Figure 1C:
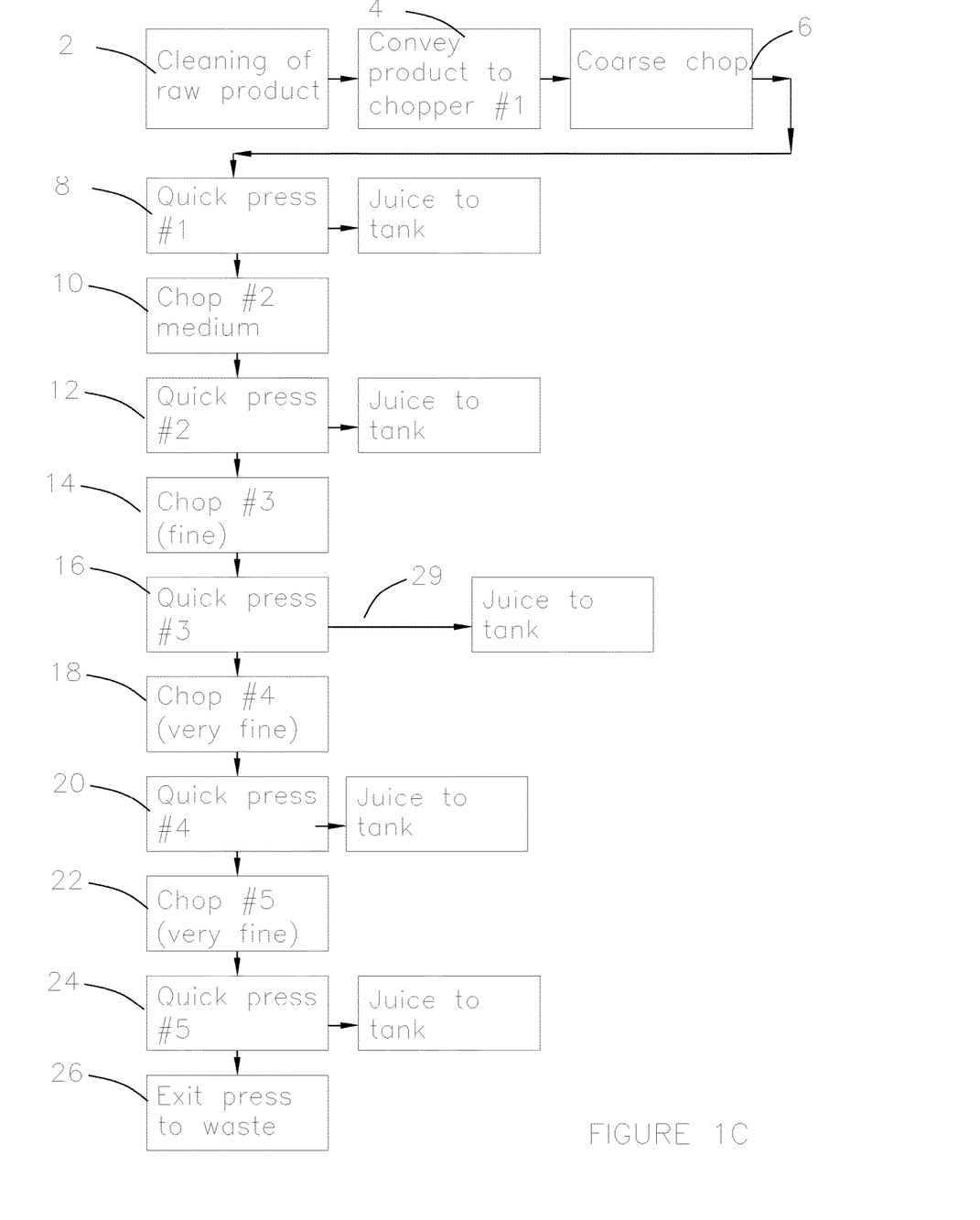
FIG. 1c is a flow chart in accordance with an embodiment of the present invention.
Figure 2:
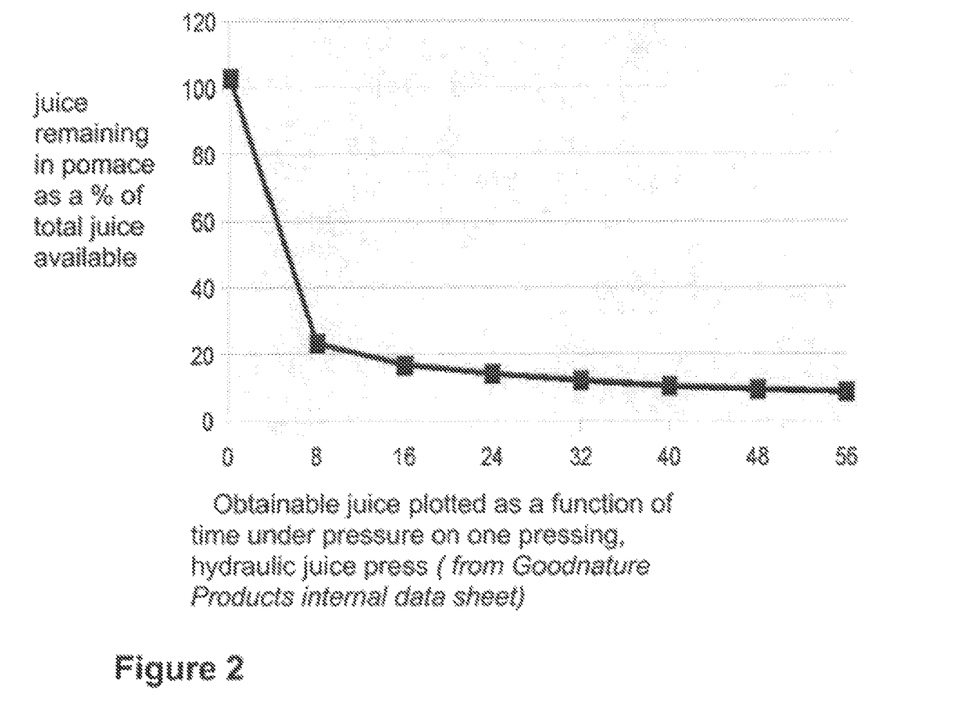
FIG. 2 is a typical curve showing juice extraction versus time achievable with a hydraulic juice press.

FIG. 1C shows one possible embodiment of the invention where food pieces to be juiced are cleaned at step 2. After cleaning the food pieces are fed via conveying step 4 to step 6 where a first comminutor which is set to reduce the food pieces into smaller pieces (termed a "coarse chop" in the Step 6). The coarsely chopped food pieces from the first comminutor are then pressed for a first juice extraction as seen at step 8. This first juicing operation is relatively quick (e.g., about a minute or so). Juice from this first pressing is sent to a holding tank (not shown).

The food pieces from the first pressing are then advanced as rapidly as possible to a second comminuting operation as seen at step 10 wherein the coarsely chopped food pieces are cut again into yet slightly smaller pieces (termed a "medium" chop in the step 10). The medium chopped food pieces are then subjected to a second pressing as seen at step 12 which may be a relatively quick pressing as in step 8 (e.g., a minute or so in duration). As in step 8, the juice extracted at step 12 is directed to a holding tank (not shown).

This process of further reduction in food piece size and pressing is conducted in alternating serial fashion as seen in steps 14-24 for as many times as desired, usually from two to eight times, but more preferably about four to five times. After the final juicing as seen at step 24, the cake, which has been chopped and pressed multiple times, is passed to a waste collector as seen at step 26.

Figure 4:
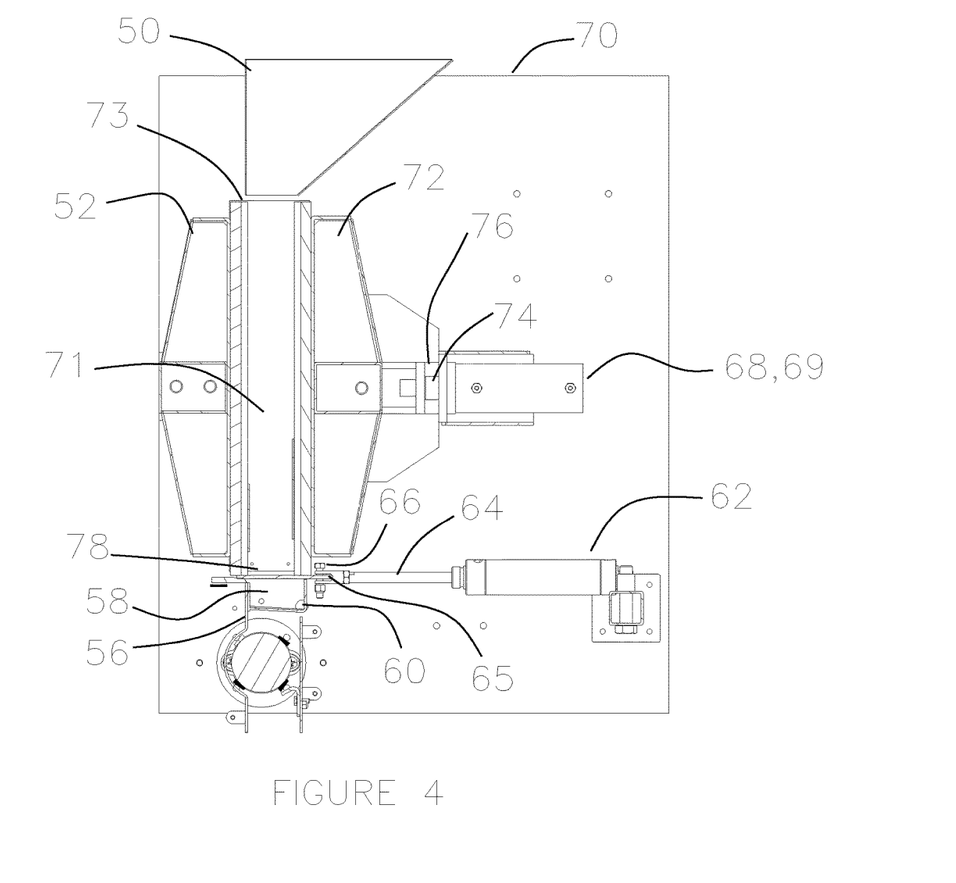
FIG. 4 is a simplified, side elevational view of an embodiment of a juicing station according to an embodiment of the invention.

Although the steps shown in FIG. 1C can be performed using any desired type of comminutor and juice extractor, one preferred embodiment utilizes the mechanical juice extractor seen in FIG. 4 which is manufactured by Goodnature Products of Buffalo, N.Y.

FIG. 4 shows a side view featuring two hydraulic or pneumatic cylinders 68 and 69 which advance the primary juicing platen 72 toward fixed platen 52. Cylinders 68 and 68 are preferably double acting cylinders so that they are also able to retract the platen 72. The moving platen 72 and fixed platen 52 are preferably covered with a foraminous material, like screening or cloth, which allow for passage of juice therethrough. The piston rods 74 of the cylinders may loosely engage the platen 72. Covers 76 may be provided to protect the cylinder rods from juice contact.

A third hydraulic or pneumatic cylinder 62 is situated so as to be able to advance the sliding juice tray 58 via its piston rod 64 which engages sliding tray tab 65 via pin 66. The sliding juice tray 58 preferably has a foraminous screen 78 covering it which forms the bottom of the juicing chamber 71 bounded by vertical fixed platen 70, fixed platen 52, and the vertical sides 73 of the chamber 71.

When moveable juice tray 58 is fully extended with its leading edge against fixed platen 52 as shown in FIG. 4, the juicing chamber 71 has 4 vertical sides and a bottom with an open top. When the sliding tray 58 is fully retracted, the juicing chamber 71 has an open bottom and an open top. In this position anything remaining in the juicing chamber (e.g., cake) will fall out through the open bottom. The provision of an open top where the food mass is passed into the juicing chamber with discharge thorough the bottom when the tray is retracted allows rapid entry of the food mass and rapid exit of the cake once the food mass had been juiced. This rapid entry and exit is particularly well suited for a juice processing line having the repetitive maceration and juice extraction steps the present invention provides.

Figure 3:
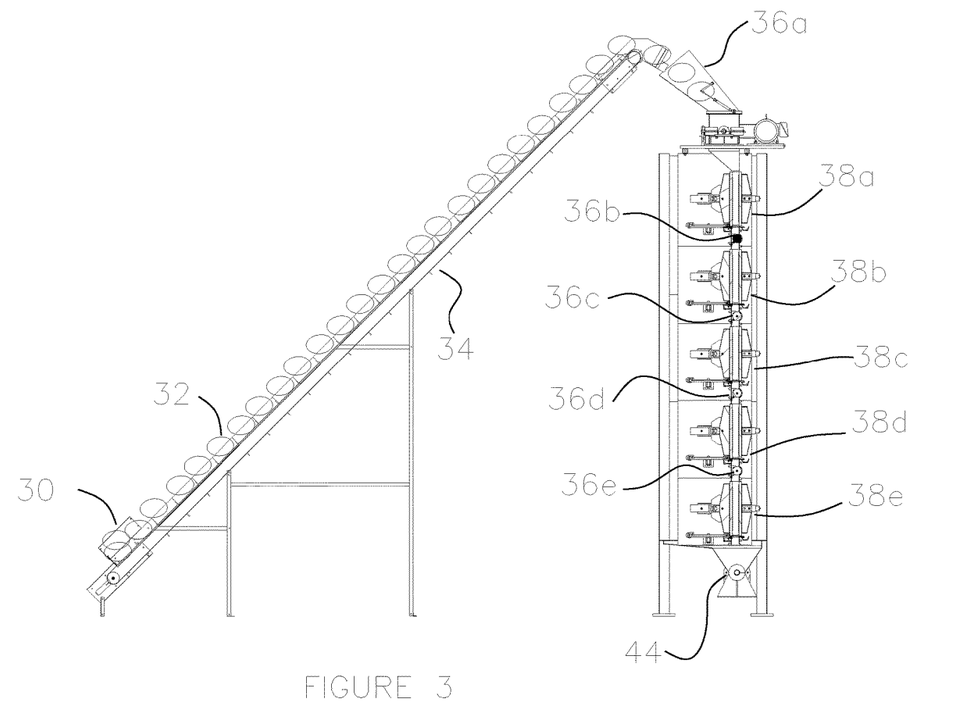
FIG. 3 is a simplified, elevational view of an embodiment of the present invention.

This is more fully illustrated in FIGS. 3 and 5A-D where FIG. 3 shows an arrangement of five juicer extractors 38a-38e interspaced with a like number of comminutors 36a-36e in a vertical column arrangement with the first (upper-most) comminutor 36a located above the first (upper-most) juice extractor 38a. The conveyor receiving hopper 30 receives food pieces 32 to be juiced and conveys the food pieces 32 via a belt 34 to the upper opening of the top comminutor 36a. The juice extractor described in FIG. 4 is labeled here in FIG. 3 as reference numerals 38a-38e although juice extractors having embodiments other than that shown in FIG. 4 may be used as desired (e.g., belt or centrifugal press). One such alternate embodiment is shown in FIG. 6 wherein a belt type press is shown at five extraction stations 101-105. In this embodiment, the food mass on the belt is pressed by a respective platen 101a-101e, respectively, which lowers onto a permeable belt 101f-101j where the food mass "fm" is located and the pressed juice is allowed to flow through the permeable belt into a juice collection tray 101k-101o located beneath the top extent of the respective belt. The respective belt then travels horizontally in the direction of the arrows to carry the extracted food mass to the next comminuting station 101p-t where the further comminuted food mass drops in the direction of the arrow on to the next lower belt, the process thus repeating with ever smaller foods particle sizes as in the other embodiment.

Figure 5A:
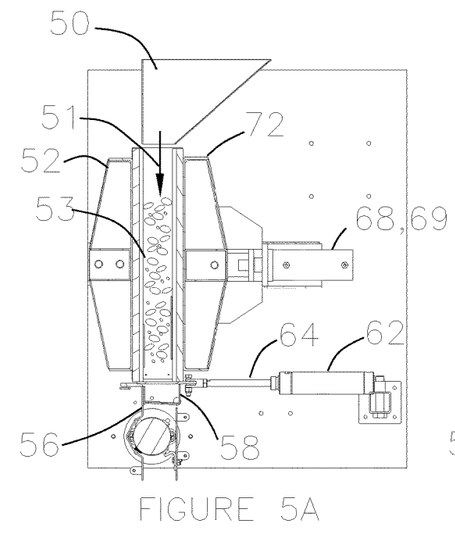
FIGS. 5a, 5b, 5c, and 5d are simplified, side elevational views showing successive steps in a single juicing operation using the embodiment of juicing station shown in FIG. 4.

The juice extracting cycle at a single juice extractor is depicted in FIG. 5A-D wherein FIG. 5A shows a juice extractor receiving shredded food pieces 53 from a comminutor exit chute 50 positioned vertically directly above the juicing chamber open top. The juicing chamber is defined by vertical juicing platen 72 (which may be a solid plate and/or a foraminous material), vertical fixed platen 52 (which may be a solid plate and/or a foraminous material), two sidewalls 73, and a horizontal bottom wall of the chamber formed by foraminous screen 78 which acts as a cover to sliding juice pan 58. The food pieces 53 may be actively thrown into the juicing chamber by the action of spinning blades (not shown) of the comminutor.

Figure 5B:
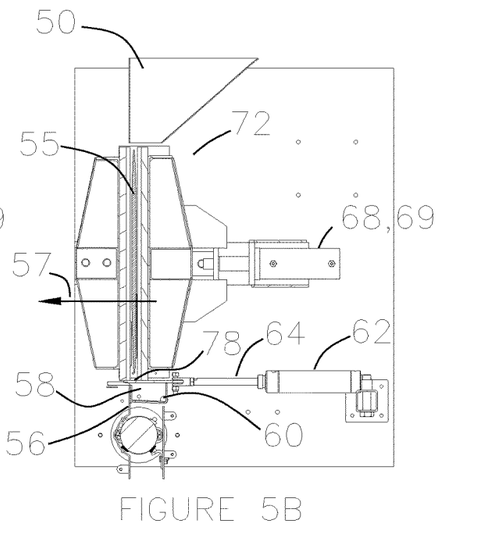
Figure 6:
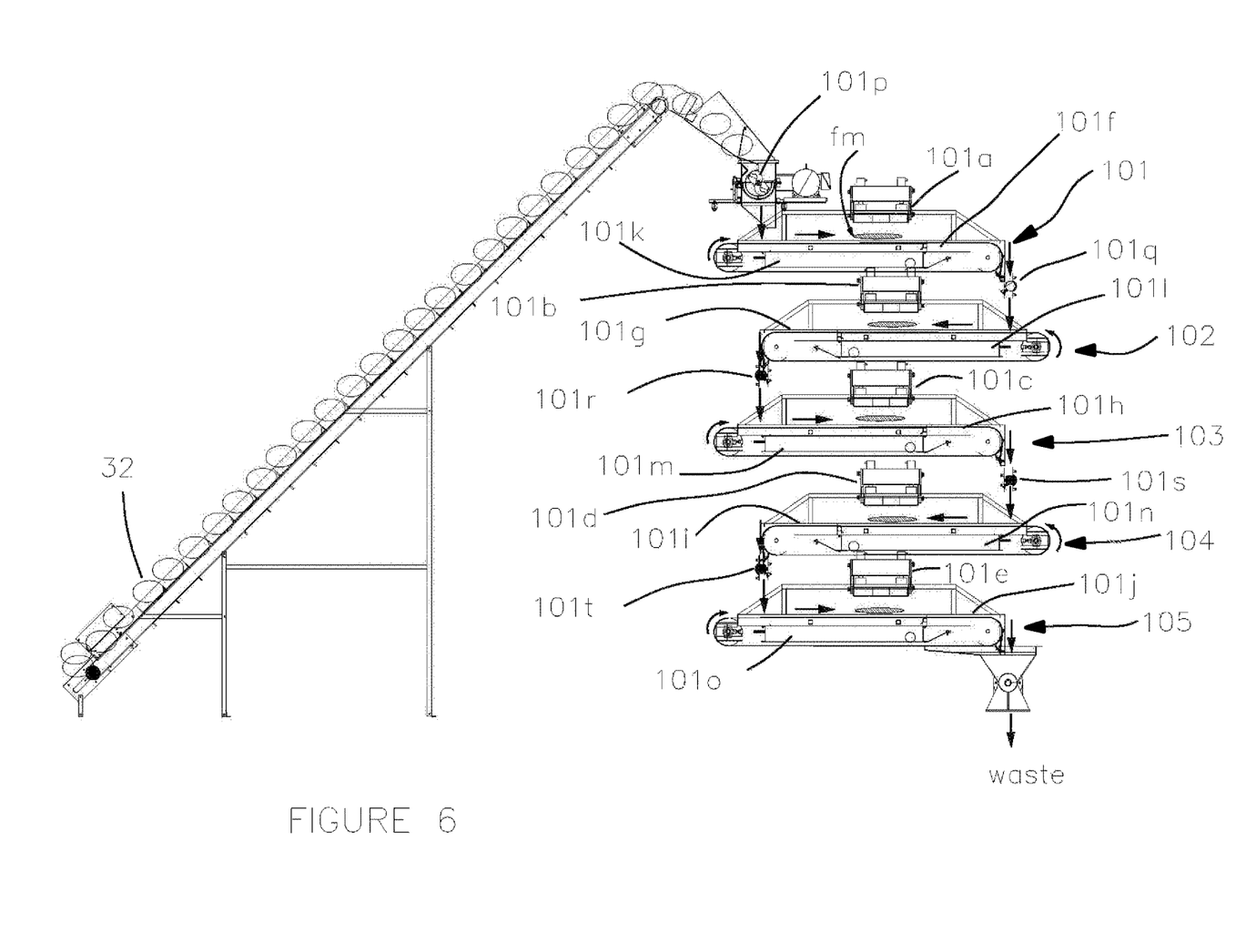
FIG. 6 is a simplified flow chart of another embodiment of the invention.

At a given signal, the delivery of the whole food pieces 32 to the comminutor is stopped and juice extraction begins as shown in FIG. 5B where the hydraulic or pneumatic cylinders 68 and 69 extend and move platen 72 horizontally towards fixed platen 52, thus trapping and pressing the food pieces 53 captured between the two platens. The extracted juice falls by gravity and passes through the screen 78 and into the juice tray 58 where it is collected and exits through the juice pan exit tube 60 to a juice holding tank (not shown).

Figure 5C:
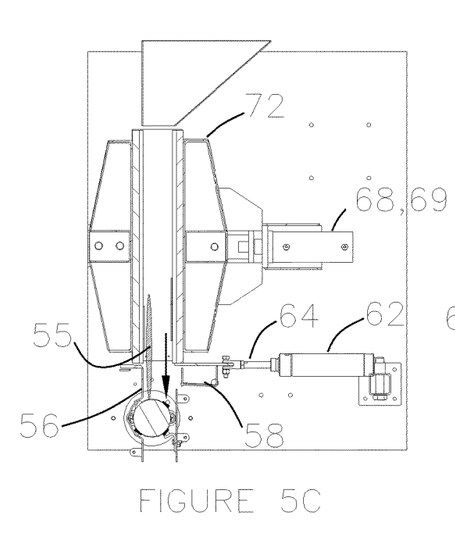

FIG. 5C shows the cake discharge cycle which proceeds as follows: after a relatively short juice extraction time, usually about a minute to two minutes, the slidable juice pan 58 is moved towards the right in FIG. 5c and the platen 72 is retracted by the retracting cylinders 68 and 69. This releases the cake 55 which falls vertically downwards as indicated by arrow 59 into the waiting input chute 56 of a second comminutor located therebeneath (not shown in FIG. 5c).

Figure 5D:
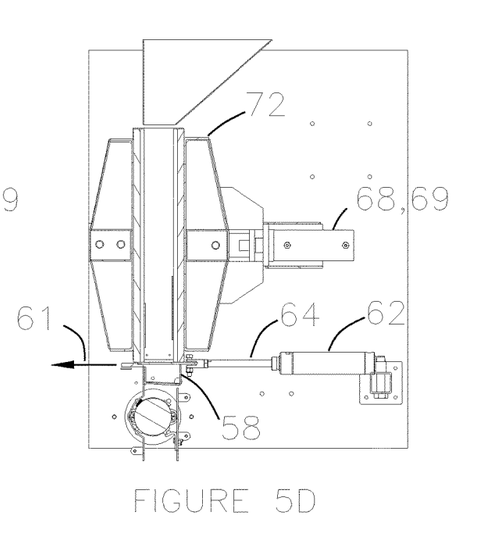

FIG. 5D illustrates the end position of a fully completed juice extraction cycle where sliding juice tray 58 is again extended and now closes off the entire bottom of the juicing chamber. The moveable platen 72 is fully retracted thereby providing maximum open space to receive the next load of chopped food pieces through the open top of the juicing chamber.

The above describes one complete juice extraction cycle for a single juice extractor. FIG. 3 illustrates how several of these juice extractors and comminutors may be positioned in alternating, serial fashion in accordance with the teachings of the present invention.

Referring to FIG. 3, a juice extraction cycle using multiple juice extractors and comminutors in accordance with the invention will now be described. As described briefly above, the conveyor receiving hopper 30 receives whole food pieces 32 to be juiced and conveys the food pieces 32 via a belt 34 to the upper opening of the first comminutor 36a which performs a coarse chop. The coarsely chopped food pieces are fed into the pressing chamber of the first juice extractor 38a. The coarse food pieces are pressed with extracted juice falling into the collection tray and then directed to a juice holding tank. The tray of first juice extractor 38a is retracted allowing the pressed coarse chop food pieces to fall into the hopper of the second comminutor 36b which performs a medium chop on the now pressed but still coarse chopped food pieces. The medium chopped food pieces are then fed from second comminutor 36b into the juice extraction chamber of second juice extractor 38b whereupon the medium chopped food pieces are pressed with extracted juice falling into the juice collection tray of second juice extractor 38b and then directed to a juice holding tank.

The tray of second juice extractor 38b is retracted allowing the pressed medium chopped food pieces to fall into the hopper of the third comminutor 36c which performs a medium/medium-fine chop on the now pressed but still medium chopped food pieces. The now medium/medium-fine chopped food pieces are then fed from third comminutor 36c into the juice extraction chamber of third juice extractor 38c whereupon the medium/medium-fine chopped food pieces are pressed with extracted juice falling into the juice collection tray of third juice extractor 38c and then directed to a juice holding tank.

The tray of third juice extractor 38c is retracted allowing the pressed medium/medium-fine chopped food pieces to fall into the hopper of the fourth comminutor 36d which performs a medium-fine/fine chop on the now pressed but still medium/medium-fine chopped food pieces. The now medium-fine/fine chopped food pieces are then fed from fourth comminutor 36d into the juice extraction chamber of fourth juice extractor 38d whereupon the medium-fine/fine chopped food pieces are pressed with extracted juice falling into the juice collection tray of fourth juice extractor 38d and then directed to a juice holding tank.

The tray of fourth juice extractor 38c is retracted allowing the pressed medium/medium-fine chopped food pieces to fall into the hopper of the fifth comminutor 36e which performs a fine chop on the now pressed but still medium-fine/fine chopped food pieces. The now fine chopped food pieces are then fed from fifth comminutor 36e into the juice extraction chamber of fifth juice extractor 38e whereupon the fine chopped food pieces are pressed with extracted juice falling into the juice collection tray of fifth juice extractor 38e and then directed to a juice holding tank.

The tray of fifth and last juice extractor 38e is retracted allowing the pressed fine chopped food pieces to fall onto conveyor 44 which delivers the now fully pressed cake for disposal.

The juice extraction cycle using multiple juice extractors and comminutors as described above may be sequenced and controlled in any desired manner. For example, a system including sensors, microprocessors and software may control the operation in a continuously moving fashion such that the food delivery and all comminutors and extractors are running simultaneously in a staged and ordered fashion. For example, when juice extractor 38a indicates that it is empty and ready for more food pieces, a signal may be sent to instruct conveyor 34 to feed the appropriate amount of food pieces to comminutor 36a with the conveyor stopping when the first extractor is full and starting again when it receives an empty signal.

In this manner, pressed food pieces may be discharged from the extractor and new food pieces loaded into the same extractor almost continuously. With the five comminutor and extractor set-up shown in FIG. 3 and approximately one minute juicing cycles at each extractor, the total juice extraction time is approximately five minutes with juice yields of 90% or higher achieved by this apparatus and method.

If desired, the pressing pressure exerted on the food pieces by the juice extractors 38a-e may be successively increased at each juice extractor (e.g., juice extractor 38a is at pressure P1; extractor 38b is at pressure P1+n1; extractor 38c is at pressure P1+n2; extractor 38d is at pressure P1+n3, etc.).

The goal to maximize efficiency of operation by minimizing processing time while producing maximum yield is further realized by minimizing the pressing time at each juice extractor while still obtaining maximum juice flow for the food pieces size at a particular extractor. This is done by monitoring (e.g., using a flow rate detector) the juice extraction flow rate and stopping the pressing operation at the time where the juice flow rate at that extractor has peaked and begins to slow. As such, time is not wasted trying to extract more juice from the cake which will instead immediately travel to the next comminutor to be chopped into a yet finer particle size to reveal more surface area and juice containing cells that will then be more easily ruptured at the subsequent pressing station. In a preferred embodiment, no more than about 5 seconds will pass between the time the maximum juice flow rate has peaked and the extracted food mass is passed to the next comminutor. In a further preferred embodiment, the system includes five extractions of one minute each and about ten seconds of comminuting between each extraction.

As described above, too fine a maceration of the food mass at the start of a juice extraction process can lead to clogging of the machine and/or difficulty in separating the juice from the solids. By using discrete and successive comminutor and extraction stations processing ever smaller food particle size, the invention minimizes the chance that those things will happen at least within the first several extraction stations while at the same time maximizing juice yield by macerating and revealing more food mass particle surface area to which maximizes juice-containing cell rupture at each extraction station.

Although the invention has been described with reference to preferred embodiments thereof, it is understood that various modifications may be made thereto without departing from the full spirit and scope of the invention as defined by the claims which follow.

The invention claimed is:

1. A method of extracting juice from a food mass comprising a plurality of individual whole food pieces, said method comprising the steps of: a) providing at least two comminutors and at least two juice extractors in alternating, serial fashion; b) passing whole food pieces into a first of said at least two comminutors, said first comminutor operable to reduce the whole food pieces into smaller food pieces; c) passing the smaller food pieces from said first comminutor to a first of said at least two juice extractors, said first juice extractor operable to extract juice from the smaller food pieces; d) passing the extracted smaller food pieces into a second of said at least two comminutors, said second comminutor operable to reduce the extracted smaller food pieces into yet smaller food pieces; and e) passing the extracted yet smaller food pieces into a second of said at least two juice extractors, said second juice extractor operable to extract juice from the yet smaller food pieces, wherein said first and second comminutors and said first and second juice extractors are positioned in vertical relationship and wherein said at least two juice extractors each include a juice chamber having an open top wherethrough food pieces are passed from the comminutor located immediately above the respective juice extractor and wherein each said juice chamber includes a movable juice collecting tray forming a bottom of the chamber opposite said open top when said tray is in a first, extended position, said tray creating an open bottom opposite said open top when in a second, retracted position and wherein the extracted food pieces may fall by gravity through said open bottom and into the comminutor located immediately below the respective juice extractor.

2. The method of claim 1, and further comprising the steps of directing extracted juice from each of said at least two juice extractors to a juice holding tank.

3. The method of claim 1 and further comprising the step of monitoring a juice extraction flow rate at each extractor and stopping the extraction operation at the time where the juice flow rate at that extractor has peaked and begins to slow.

4. The method of claim 1, said method further comprising the steps of: f) providing a third comminutor and third juice extractor; g) passing the yet smaller food pieces from said second juice extractor into said third comminutor, said third comminutor operable to reduce the yet smaller food pieces from said second juice extractor into still smaller food pieces; h) passing the still smaller food pieces from said third comminutor to said third juice extractor, said third juice extractor operable to extract juice from the still smaller food pieces.

5. The method of claim 4, said method further comprising the steps of: i) providing a fourth comminutor and fourth juice extractor; j) passing the extracted still smaller food pieces from said third extractor to said fourth comminutor, said fourth comminutor operable to reduce the extracted still smaller food pieces into yet still smaller food pieces; and k) passing the yet still smaller food pieces to said fourth juice extractor, said fourth juice extractor operable to extract juice from the yet still smaller food pieces.

6. The method of claim 5, said method further comprising the steps of: l) providing a fifth comminutor and fifth juice extractor; m) passing the extracted yet still smaller food pieces from said fourth extractor to said fifth comminutor, said fifth comminutor operable to reduce the extracted yet still smaller food pieces into very fine food pieces; and n) passing the very fine food pieces to said fifth juice extractor, said fifth juice extractor operable to extract juice from the very fine food pieces.

7. The method of claim 6, and further comprising the steps of: o) monitoring a rate of juice flow from each extractor and stopping the extraction step at that extractor and proceeding to the next passing step after peak juice flow rate has been reached.

8. The method of claim 6, wherein each extraction operation includes a respective pressing pressure, and further comprising the step of increasing the respective pressing pressure at each successive extractor.

* * * * *